May 2, 1939.  W. G. WEHR  2,156,827
MONORAIL SUPPORT AND COUPLING
Filed July 15, 1935  2 Sheets-Sheet 1
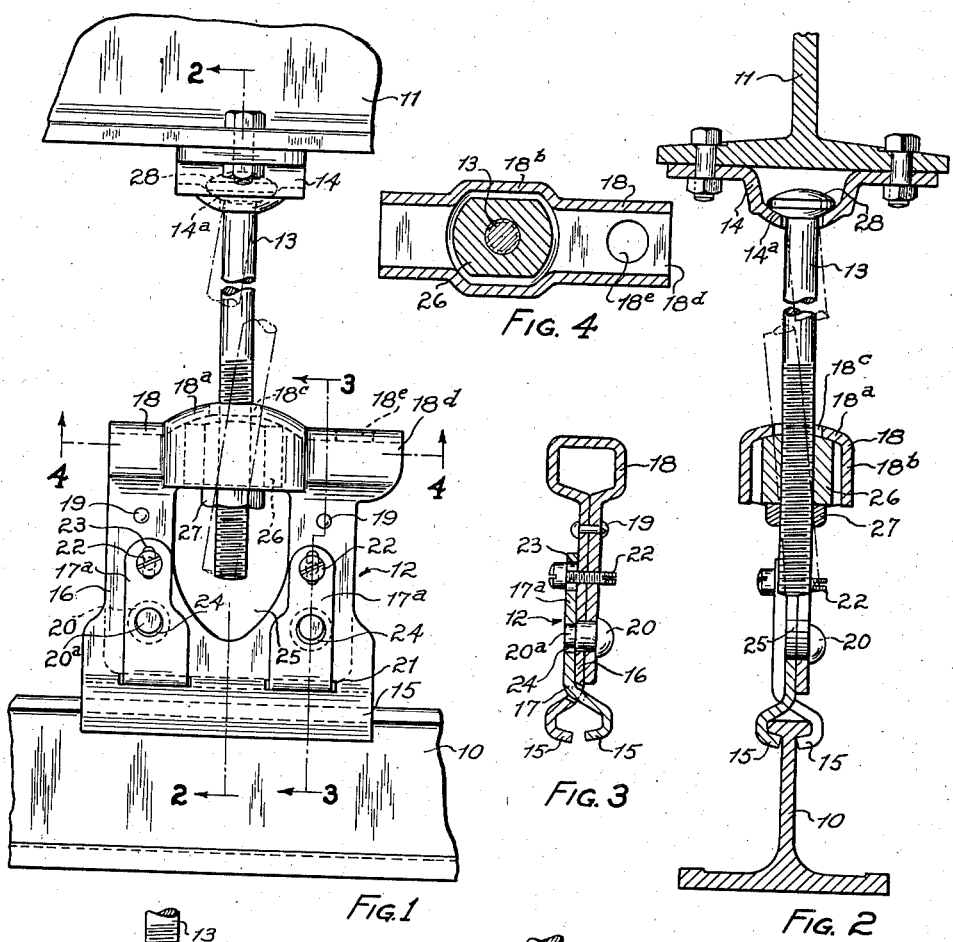
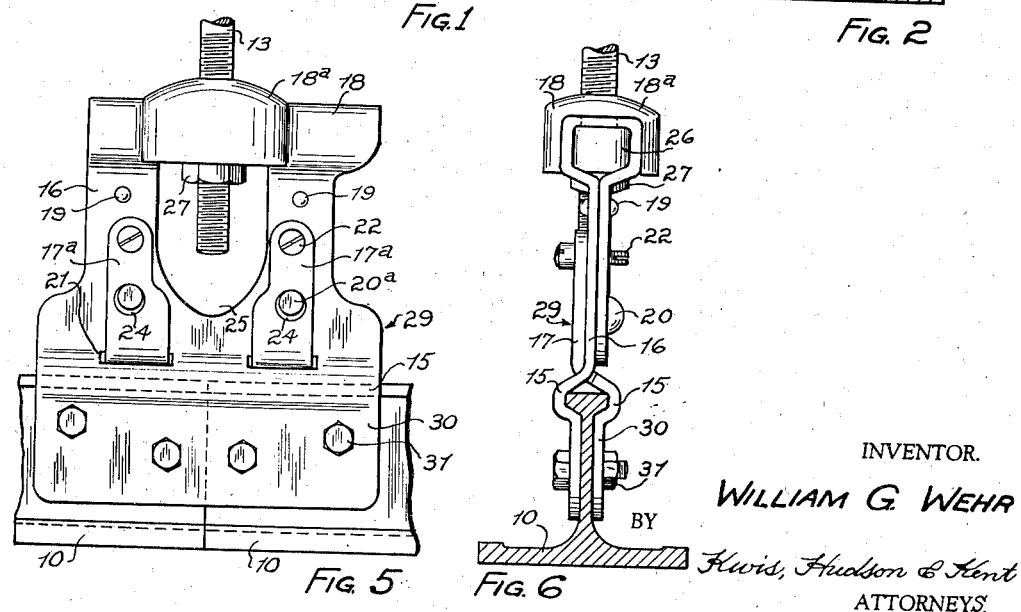
INVENTOR.
WILLIAM G. WEHR
BY
Kwis, Hudson & Kent
ATTORNEYS.

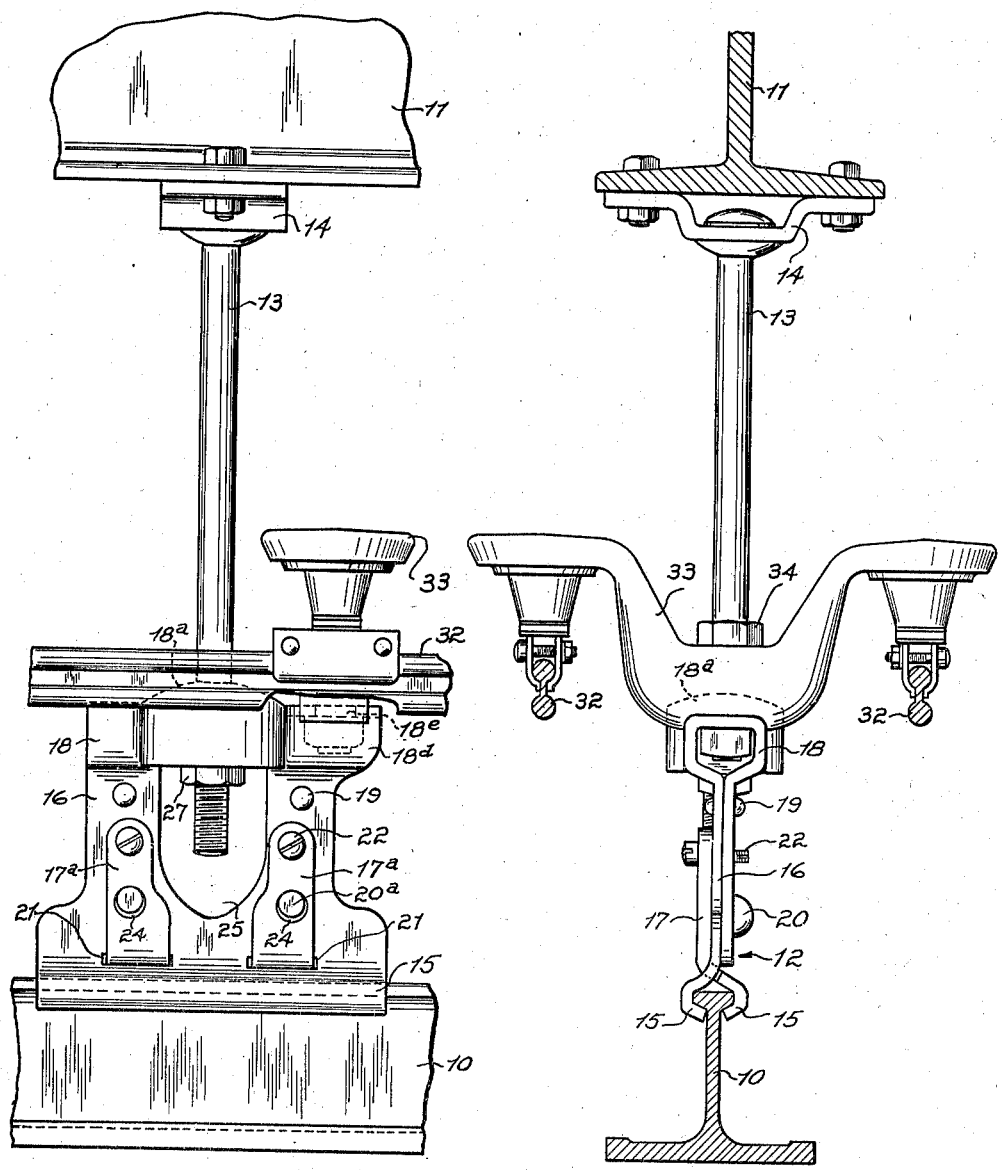

Patented May 2, 1939

2,156,827

UNITED STATES PATENT OFFICE 2,156,827

MONORAIL SUPPORT AND COUPLING

William G. Wehr, Wickliffe, Ohio, assignor to The Cleveland Crane & Engineering Company, Wickliffe, Ohio, a corporation of Ohio Application July 15, 1935, Serial No. 31,354

9 Claims. (Cl. 104—111)

This invention relates to a monorail supporting clamp or clamp and coupling, and, in one respect, is an improvement on the clamp and monorail support constituting the subject matter of the patent to Earl T. Bennington, No. 1,412,830, granted April 18, 1922.

One of the objects of the invention is to provide a monorail support having a clamp which is generally more satisfactory and more effective than that shown in the Bennington patent, and particularly to provide a support wherein the suspending bolt which supports the clamp is relieved of stresses incident to lateral movement or swaying of the supported rail.

A further object is to provide a clamp construction which admits of a lock nut being screwed onto the suspending bolt beneath the main nut which receives the load of the clamp, and to form the clamp in a manner such that access may be had to the lock nut for tightening it against the bottom of the main nut with a wrench.

A still further object of the invention is to make provision for supporting on the clamp of the monorail support the conductor bars which are associated with the rail to supply current to the carriers traveling thereover.

Further objects which will appear from the following description are attained by the present invention which may be here briefly summarized as consisting in certain novel details of construction and combinations and arrangements of parts which will be described in the specification and set forth in the appended claims.

In the accompanying drawings which illustrate preferred embodiments of the invention, Fig. 1 is a side view of a portion of monorail and a side view of one of the rail supports constituting the subject matter of the present invention with the conductor bar support omitted;

Fig. 2 is a transverse sectional view substantially along the line 2—2 of Fig. 1;

Fig. 3 is a transverse sectional view substantially along the line 3—3 of Fig. 1;

Fig. 4 is a horizontal sectional view substantially along the line 4—4 of Fig. 1;

Figs. 5 and 6 are views similar to Figs. 1 and 2 showing a modification wherein the clamp of the rail support also has a coupling function; and Figs. 7 and 8 are views similar to Figs. 1 and 2 showing also a pair of conductor bars for supplying current to the motors of the carriers which travel over the rail and a transverse conductor bar support mounted on the clamp.

Referring now to the drawings, 10 represents a monorail which is supported in accordance with the present invention from any suitable fixed overhead member here illustrated as an I-beam 11. It will be understood that the monorail will be supported at suitable intervals by the novel supporting means herein illustrated, described and claimed, and that the rail 10, on the horizontal flanges of which travel the wheels of the carriers which are generally electrically propelled, may be of standard construction.

The clamp forming a part of the monorail support may engage the rail to support it only, as illustrated in Figs. 1 to 4, or it may be modified so that, when applied to the joint between the abutting ends of two adjoining rails, it will serve both as a rail support and a coupling, as illustrated in Figs. 5 and 6.

Referring first to the constructions shown in Figs. 1 to 4, the support for the monorail 10 includes a clamp designated as a whole by the reference character 12, a suspending bolt 13, and a suitable bolt supporting member such as a plate or bracket 14 which is suitably connected to the I-beam 11 or other stationary overhead support. The clamp 12 is provided at the bottom with two jaws 15 which engage the head of the monorail 10, this clamp being formed principally from two plates 16 and 17 having crossed portions immediately above the jaws 15 and secured together in a manner to be described.

Between the jaws and the top of the clamp the plates are flat and are in face-to-face relation, as shown in Fig. 3, and, as will be seen from this figure, the plate 16 extends upwardly and at the top of the clamp is enlarged to form a housing 18 and is then extended downwardly in overlapping relation with the main or body portion of the plate nearly to the jaws 15. The overlapping portions of the plate 16 are suitably secured together, in this instance, by an upper pair of rivets 19 and a lower pair of rivets 20, the latter of which have reduced ends 20a which extend outwardly beyond the main or body portion of the plate 16 for a purpose to be described.

The plate 17, above the corresponding jaw 15, has two spaced tongues 17a (see particularly Fig. 1) which extend through slots 21 formed in the plate 16 immediately above the corresponding jaw 15 so that the two plates are in crossed relation and the jaws 15 will be closed on the head of the rail with a scissors action. The tongues 17a extend upwardly along the face of plate 16 and they are fastened to the overlapping portions of plate 16 by securing means consisting in this case of screws 22. However, it is desired that these screws be relieved of the supported load, and, accordingly, they extend through elongated slots 23 in the tongues 17a, while the load is taken or transmitted to the main plate 16 by the extending ends 20a of the rivets 20, the said rivet ends fitting into openings 24 formed in the tongues in the manner clearly shown in Figs. 1 and 3.

By reference to Fig. 1 it will be seen that the tongues 17a are spaced some distance apart and that in the vertical overlapping portions of the plate 16 there is an opening 25 having a width equal substantially to the space between the tongues and extending from the housing and down nearly to the jaws.

The housing 18 which is formed from the plate 16 at the top of the clamp has an enlarged middle portion with a rounded or spherically curved top 18a and with substantially flat sides 18b. In the center of the rounded top 18a there is an opening 18c through which the bolt 13 extends, generally, some distance downwardly beneath the housing into the cutaway portion 25. It will be noted that the diameter of the opening 18c is somewhat larger than the diameter of the bolt 13 so that the latter will have a clearance therein.

The load is transmitted from the clamp to the suspended bolt 13 by an abutment consisting in this instance of a nut 26 which is screwed onto the bolt and located within the housing 18 beneath the rounded top 18a and between the flat sides 18b thereof which prevent the turning of the nut. Also screwed onto the bolt beneath the nut 26 and into contact therewith is a lock nut 27, the arrangement being such that the lock nut lies wholly or partially beneath the sides of that portion of the housing which encloses the main nut 26 in the cutaway portion 25 which is of sufficient size to permit the manipulation of a wrench utilized in tightening the lock nut.

The nut 26 has a rounded or spherically shaped top which engages the correspondingly shaped underside of the rounded top 18a of the housing 18 so that the nut and top or dome of the housing have the equivalent of a ball and socket connection and may have a universal relative rocking motion. Likewise, the head 28 of the bolt 13 is rounded particularly on its underside, the rounded underside of the bolt head engages a correspondingly rounded seat 14a of the plate 14, so that universal rocking movement may take place between the bolt and the plate. It will be apparent that by having the engaging portions of the housing and the nut and the engaging portions of the bolt head 28 and the bracket rounded or spherically curved, the clamp may move or rock on the supporting nut 26 and the head of the bolt will similarly rock on its seat and thus relieve the bolt of bending stresses due to the swaying of the monorail as occurs in practice. Likewise, by forming the clamp in a manner such that the lock nut 27 may be screwed onto the bolt into engagement with the lower side of the main nut instead of being screwed upon the bolt above the housing and brought into engagement with the top of the housing as has been the practice heretofore, the tightening of the lock nut imposes no initial stress on the suspending bolt at a point just above the housing. By reason of this provision and because of the universal or ball and socket connections between the clamp and the bolt and between the bolt and its support, the likelihood of the bolt snapping under load is practically eliminated. In the prior practice of mounting the lock nut on the bolt above the housing and then screwing the lock nut into tight contact with the upper side of the housing, the latter was firmly clamped between the lock nut and the main nut located beneath the upper side of the housing, wherefore there could be no relative swivelling movement between the housing and suspended bolt, with the result that when the monorail system swayed laterally, as the carriers passed therealong, bending stresses were created in the bolt adjacent the point where the housing was clamped between the lock nut and the main nut.

It was previously mentioned that the clamp may have a coupling function to couple two adjoining monorails as well as a supporting function. As illustrated in Figs. 5 and 6, when a clamp is arranged at the abutting ends of two rails 10, 10, as shown in Fig. 5, a special clamp 29 is employed which differs from the clamp 12 only in the respect that the lower portions of the jaws 15 are extended downwardly as shown at 30 on opposite sides of the web of the monorail and are secured together and clamped against opposite sides of the web by bolts 31 or equivalent securing means. The clamp is otherwise identical with that first described and therefore needs no further description.

It was stated in the early part of the specification that one of the objects of the invention is to provide means whereby the conductor bar support may be mounted on the clamp. The arrangement of the conductor bar support and the manner of mounting it on the clamp are illustrated in Figs. 7 and 8, but the conductor bar support and the conductor bars themselves are omitted from Figs. 1 to 6 for the sake of clearness. Heretofore, the supporting of the conductor bars in fixed relation with respect to the rail has presented a problem not easy of solution. Attempts have been made to support the conductor bar supports on the suspending bolts, but this has not proved satisfactory and presented many difficulties. In accordance with the present invention, the conductor bar support is mounted on and secured to the clamp at one side of the suspending bolt.

Referring to Figs. 7 and 8, it will be noted that the monorail 10 and the clamp 12, and the manner of supporting the clamp are identical with the constructions shown in Figs. 1 and 2, and, accordingly, the parts of the clamp and all the other portions of the monorail support in Figs. 7 and 8 have the same reference characters as in Figs. 1 to 4. However, the clamp may be constructed as shown in Figs. 5 and 6 since, so far as the conductor bar support and the manner of attaching it to the clamp are concerned, the clamp may have a rail coupling as well as a supporting function. In Figs. 7 and 8 I have shown at 32 conductor bars arranged on opposite sides of the monorail for supplying current to the motors of the carriers which travel therealong, these conductor bars being secured to but insulated from the ends of a transversely arranged conductor bar support 33 the middle portion of which rests upon and partially embraces the upper end portion of the housing at one side of the rounded or dome-shaped portion 18a. To accommodate this conductor bar support in the manner illustrated, one end 18d of the housing is extended lengthwise of the housing further than the opposite end, and this portion of the housing is provided with an opening 18e which is slightly below the level of the opening 18c for the suspending bolt 13 and suitably displaced therefrom. The conductor bar is secured to the housing by a bolt 34, as shown in Fig. 8, the single bolt being sufficient to fasten the conductor bar support to the housing by reason of the fact that the middle portion of the conductor bar support has a rounded seat which is shaped in accordance with and fits over and partially embraces the upper part of the housing. The conductor bars may thus be supported on all or on the desired number of clamps 12 which support the monorail, as will be found necessary or desirable.

It will be seen from the above that the objects of the present invention are attained very effectively by the construction illustrated, and while I have shown the preferred construction and a modification in the clamp to adapt it for the rail supporting and rail coupling functions, I do not desire to be confined to the precise details shown but aim in my claims to cover all modifications which do not involve a departure from the spirit and scope of the invention.

Having thus described my invention, I claim:

1. In a rail support of the character described, a clamp having at the bottom a pair of jaws and at the top a housing with a rounded upper portion, a supporting member extending through the housing and having an abutment with a rounded top portion engaging the rounded portion of the housing to permit relative swinging movement between the clamp and the supporting member.

2. In a monorail support such as described, a clamp formed by two members secured together and having crossing portions with jaws at the bottom of the clamp to engage the top of the rail to be supported, said clamp having at the top thereof a housing or chamber with a rounded top wall and a supporting bolt extending through the rounded top wall of the housing and carrying an abutment with a rounded top portion engageable with said wall to permit relative swinging movement between the bolt and the clamp.

3. In a monorail support of the character described, a clamp having at the bottom jaws for engaging the head of a rail and having at the upper portion thereof a housing with a rounded top and with substantially flat parallel sides, and a supporting bolt extending through the rounded top of the housing and carrying a nut with a rounded top portion engageable with the under side of the rounded top of the housing and fitting in between the sides of the housing.

4. In a monorail support of the character described, a clamp provided at the bottom with a pair of jaws for engaging the head of the rail and provided at the top with a housing having a dome-shaped top and an opening extending therethrough, a supporting bolt extending through the dome-shaped top and carrying a nut having a rounded top portion engaging the under side of said dome-shaped top, and a lock nut secured on the bolt beneath said nut to prevent turning of the bolt, the body of the clamp beneath the housing being cut away to provide clearance to permit the application of a wrench to the lock nut.

5. In a monorail support of the character described, a clamp composed of two plates secured together and having crossing portions forming jaws for engagement with the head of a rail, one of the plates being doubled upon itself and provided at the upper portion of the clamp with a housing with a rounded top, a supporting bolt extending through the rounded top of the housing and having a main nut with a rounded top engaging the rounded top of the housing, and a lock nut beneath the main nut to prevent turning of the bolt.

6. In a monorail support of the character described, a clamp composed of two plates secured together and having crossing portions forming jaws for engagement with the head of a rail, one of the plates being doubled upon itself and provided at the upper portion of the clamp with a housing having a rounded top, a supporting bolt extending through the rounded top of the housing and having a main nut with a rounded top engaging the rounded top of the housing, and a lock nut beneath the main nut to prevent turning of the bolt, a portion of the clamp beneath the housing being cut away to provide clearance for a wrench engageable with the lock nut to tighten the same.

7. A monorail supporting clamp composed of two plates with crossed portions and with jaws at the bottom of the clamp to receive the head of a rail, one of said plates being doubled upon itself to form overlapping portions which are spread at the top of the clamp to form a housing, said overlapping portions being cut away beneath the housing, means extending through the overlapping portions and provided with extensions, the other plate having above the corresponding jaw a pair of tongues which extend through the first described plate above the jaw thereof and alongside said plate, and screws for fastening the tongues to the first described plate and extending freely through openings in said tongues, said tongues having openings which receive and engage the extensions of the first mentioned means so that the latter will relieve the screws of the supported load.

8. A monorail supporting clamp composed of two plates having jaws to receive the head of the rail, one of the plates being doubled upon itself to form a housing at the top of the clamp and having overlapping portions, extending through said overlapping portions and securing the same together, a second means extending through said overlapping portions, means extending freely through an opening in the other plate for securing the same to the first named plate, the ends of the second named means extending through the overlapping portions of the first named plate extending through an opening in and contacting said second named plate to relieve said last named means of the supported load.

9. A monorail supporting clamp composed of two plates provided with jaws at the lower part of the clamp, one of said plates having a body portion which extends upwardly from the jaw and is doubled upon itself and enlarged to form a housing and returned alongside the body portion down to near the jaw, means extending through the overlapping portions of said plate to fasten them together, a second means extending through said overlapping portions, the other plate being provided with a jaw and with tongues extending through the first named plate and alongside the same, screws for fastening the tongues to the first named plate and extending freely through the tongues, said second named means which extend through the overlapping portions of the first named plate having extensions passing through openings in and contacting with the second named plate to relieve the screws of the supported load.

WILLIAM G. WEHR.